Figure 1:
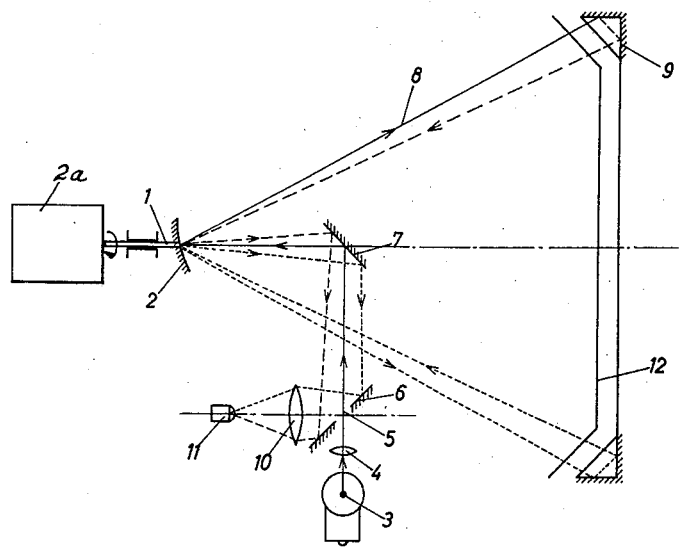

Jan. 8, 1963 E. K. SICK 3,072,798
PHOTOELECTRIC DEVICE
Filed Oct. 27, 1959 3 Sheets-Sheet 1

INVENTOR,
Erwin Sick
BY
Jones, Danby • Robertson

Jan. 8, 1963 E. K. SICK 3,072,798
PHOTOELECTRIC DEVICE
Filed Oct. 27, 1959 3 Sheets-Sheet 3

INVENTOR.
ERWIN SICK
BY
Darbo, Robertson + Vandenburgh
ATT'YS.

United States Patent Office 3,072,798
Patented Jan. 8, 1963

3,072,798
PHOTOELECTRIC DEVICE
Erwin K. Sick, An der Allee 7, Waldkirch,
Breisgau, Germany
Filed Oct. 27, 1959, Ser. No. 848,997
10 Claims. (Cl. 250—230)

This invention relates to photoelectric devices, and particularly to such devices using fixed photoelectric detecting means.

Pre-selection counting devices have been disclosed in the prior art. Such devices include an inclined mirror which is arranged on a counting shaft. A beam of light parallel to the axis of the shaft is deflected from the inclined mirror in such a manner that it describes a conical surface and cooperates as a light pointer with a counting disc forming the base of the cone. A photoelectric detector, e.g. a photocell is arranged on the circumference of the counting disc over which the light pointer sweeps. The apparatus can be adjusted so that a particular number appearing on the counting disc may be pre-selected, and a switching operation will be initiated as soon as the photocell is acted upon by the light pointer, indicating that the particular number of counting impulses selected have been reached.

This arrangement retains the disadvantage that the sharpness of the switching impulses and the accuracy of the adjustment is limited by the width of the photoelectric detector used. An additional disadvantage is that it is necessary to mount the detector adjustably, and to connect it by means of flexible wires.

It is an object of the present invention to avoid the disadvantages of the device described.

In accordance with the invention, a photoelectric device of the kind described is provided having such a structure that the beam of light is reflected into itself by a reflex-reflecting element, and the return beam of light is directed laterally out of the path of rays onto a fixed photoelectric detector. It is then no longer necessary to adjust the detector. Instead, the reflex-reflecting element may be masked except for one or more narrow slots which are left exposed. The beam of radiation is then reversed only when it sweeps over such slots, at which time it provides a sharp electric impulse when the reverse beam impinges on the photoelectric detector. By means of the present invention, a single photoelectric detector may be caused to generate a plurality of impulses during each rotation of the beam of light, where such a condition is necessary.

For example, if the counting device is designed to operate in such a manner that the counting shaft carries out one complete revolution when activated by three hundred counting impulses, a diaphragm having six slots may be arranged in front of the reflex-reflecting element. A switching impulse may then be obtained from the photo-electric detector after each fifty counting impulses. Such a device may for example be used where a siding may for instance be actuated with a packing machine. If it is desired to enlarge or diminish the sequence of switching impulses, only the marking of the reflex-reflecting element need be changed.

In addition to use with pre-selection counting devices of the kind described above, the system for the guidance of rays according to the invention is adaptable to more general fields of application and can be used with various other devices.

For instance, the present system may be used in the construction of a follow-up system, wherein, by means of impulses applied to the photo-electric detector, the device may be controlled to follow a rotatable member, or vice versa. The rotatable member, which may for example consist of the shaft of a measuring system, need have only a light mirror mounted thereon, the light mirror being arranged to direct a beam of rays to the reflex-reflecting element.

The reflex-reflecting element may alternatively consist of a triple mirror which is arranged on the pointer of a measuring system. By this means the pointer may be scanned photo-electrically and remain reaction-free. The method of guiding rays according to the invention may also be used to form photo-electric light barriers for use as safety devices in conjunction with presses or the like. Photo-electric barriers have been known, particularly for use with single post presses, wherein a monitoring beam of radiation periodically sweeps over a protection area, said beam being directed from a source of radiation arranged above or below the protection area via a horizontally arranged reflex-reflecting element to a photo-electric detector arranged above or below the protection area. Such a device avoids the necessity for having elements arranged at the sides of the protection area. Such an arrangement of the light barrier, as is known, makes it also possible to apply the light barrier to those machines such as single post presses with which the constructional elements cannot be fixed at the sides of the protection area. However, with such an arrangement, it is often necessary to take special measures to avoid the possibility that a workman might reach around the protection area swept by the monitoring beam of rays. It has therefore already been proposed that a side lattice or screen be provided in addition to the photo-electric barrier covering the front of the working area. In some cases, however, such a lattice may hinder the working process. By means of the guiding of rays according to the invention, a conical light curtain bent rearwardly can be generated, which coacts with a correspondingly curved reflex-reflector. Preferably the device is designed and constructed in such a manner that the monitoring beam of radiation is directed in cyclic succession to several, preferably three, rotating mirrors forming a pyramid.

The invention will now be more fully explained in terms of two embodiments of the invention as schematically represented in the accompanying drawings, wherein:

FIG. 1 schematically shows an embodiment of the invention for use as a photo-electric pre-selection counting device.

Figure 1A:
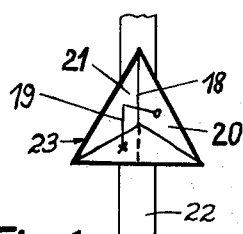

FIG. 1a schematically shows a reflex-reflecting triple mirror.

Figure 2:
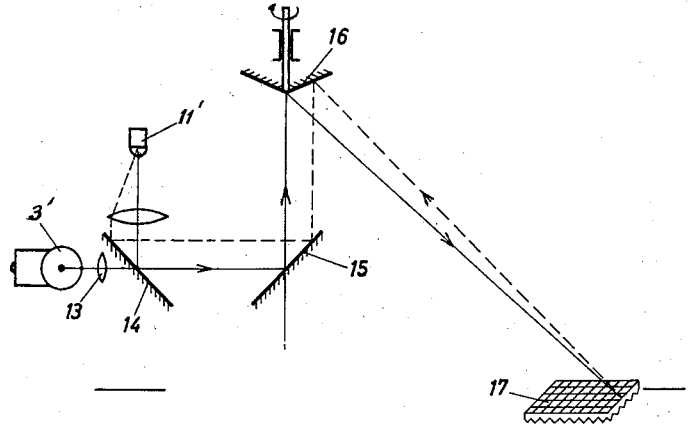

FIG. 2 schematically illustrates a device for forming a light barrier according to the invention.

Figure 3:
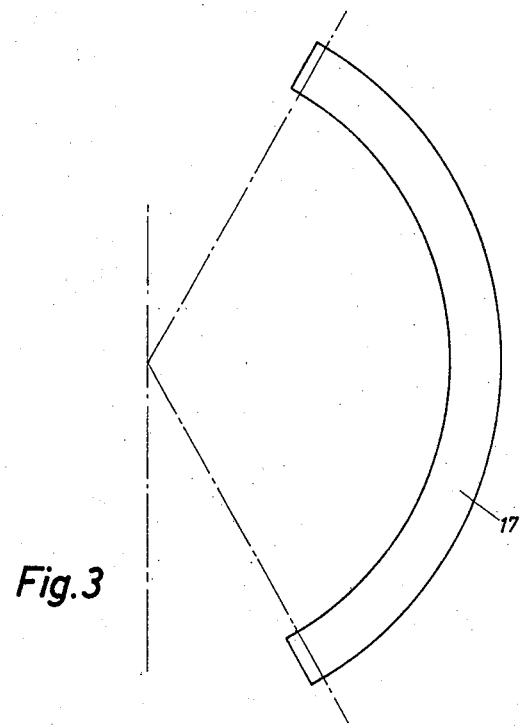

FIG. 3 illustrates schematically the construction of the reflex-reflector, and

Figure 4:
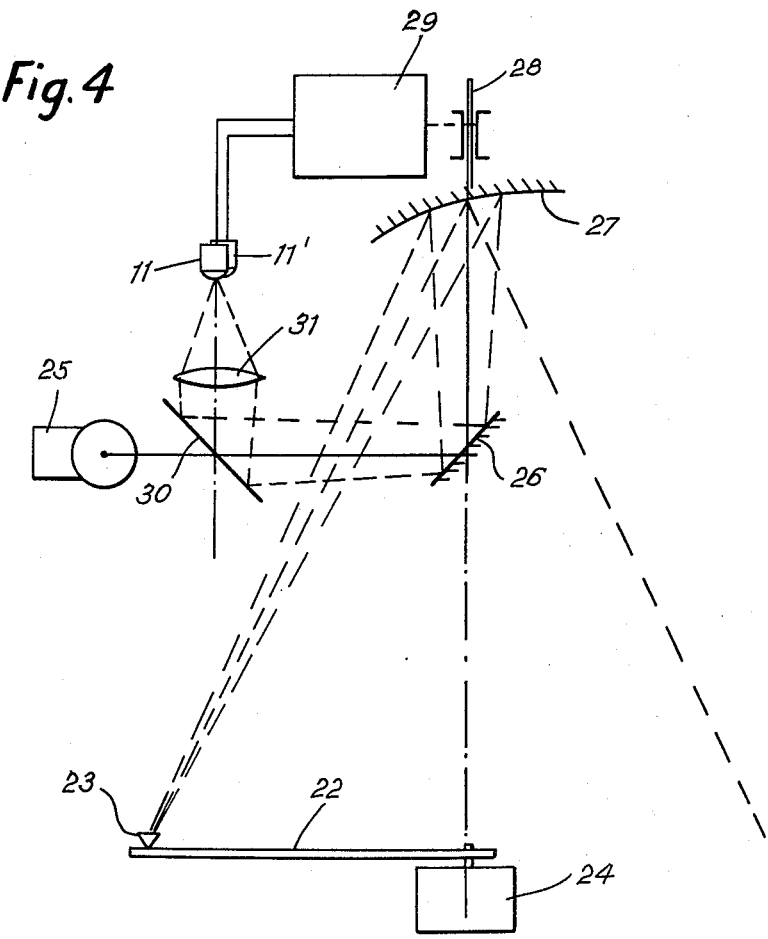

FIG. 4 schematically illustrates a follow-up system utilizing the invention.

Referring to FIG. 1, the reference numeral 1 designates a counting shaft bearing at its end a nutating mirror 2 designed as a concave mirror. The counting shaft 1 is a part of a counting motor 2a which is designed to rotate the shaft 1 a predetermined fractional part of a revolution for each electrical impulse applied to the motor circuit, according to principles well known in the art. A beam of rays issuing from a laterally arranged source of light 3 is directed through a lens 4 and a hole 5 in a mirror 6 inclined with respect to the path of rays, and by means of a fixed mirror 7 arranged in the extension of the shaft 1, is directed parallelly to the axis of the shaft to the nutating mirror 2. As the shaft 1 rotates, the beam of rays describes a conical surface 8, and the beam is then directed to an annular prism 9 acting as a totally reflecting reflex-reflecting element, accomplishing the reversing of the beam of rays substantially parallel to itself. By means of the curvature of the mirror 2, the beam of rays is focused in the plane of the annular prism. The device is constructed in such a manner that the beam of rays is incident somewhat laterally of the edge of the annular prism, so that it is reversed in a path which is displaced by a small amount with respect to the path of incidence. The beam then returns to the mirror 2 which directs it to the mirror 7, from where it is again reflected toward the source of light. Because of the lateral displacement of the beam, it does not pass through the hole 5, but impinges upon the mirror 6. The mirror 6 causes it to deviate laterally out of the path of rays and directs the beam through a lens 10 to a photo diode 11.

The annular prism is masked by a slotted screen 12 absorbing the incident beam of rays 8, so that only at those spots where the slots are provided for does a reversion or reflex-reflection of the kind described above take place, with the result that the photodiode 11 produces impulses.

The light barrier or curtain according to FIG. 3 is optically constructed in a similar manner. From the source of light 12 the beam of rays collected by a lens 13 passes through a partially transparent mirror 14 and is directed by a fixed mirror 15 parallelly to the axis to three rotating nutating mirrors 16 forming a pyramid. The beam of rays is deviated in cyclic succession from each one of the nutating mirrors in such a manner that it describes a conical surface through a range of an angle of 120°. This range of angle is thus thrice swept over by the beam of rays during each rotation of the mirror pyramid.

The beam of rays then hits a reflex-reflector 17 extending over 120° and correspondingly curved. Preferably it consists of a plurality of small triple elements. By means of the reflex-reflector the beam of rays is reversed and reaches parallelly to itself, via mirrors 16, 15, and 14, a photodiode 18.

The light curtain thus obtained is bent backwards as can be clearly seen from FIG. 3 so that it is practically impossible to reach around it and special protection lattices or screens are unnecessary.

A follow-up system, as shown in FIG. 4, can for instance be provided in such a manner that the member to be scanned, in particular an instrument pointer 22, is provided with a small reflex-reflecting triple mirror 23 shown in detail in FIG. 1a, one roof edge whereof extends along the axis of the pointer. The instrument pointer 22 is mounted on an instrument 24 which may be any one of many different types of instruments such as electrical current indicating meters. A light source 25 sends a beam of light to a mirror 26, which reflects the beam to a concave mirror 27 rotatively mounted on a shaft 28 at an acute angle. The shaft 28 may be rotated in either direction by means of a servo-mechanism 29 connected thereto. The light beam is reflected by the mirror 27 to the reflex-reflecting mirror 23 which returns the beam into itself and back to the mirror 27, the mirror 26 and the mirror 30. The mirror 30 is designed so that it permits the original beam emanating from the light source 25 to pass directly therethrough to the mirror 26, but reflects the beam emanating from the mirror 26 on its return. In order to accomplish this result, it may be provided with a central aperture in order to pass the beam from the light source 25. Alternatively, it may consist of a mirror designed to pass light in one direction but to reflect it in another. The light beam from the mirror 30 is reflected to the lens 31 which focuses the beam in a plane passing through the sensitive elements of the photodiodes 11, 11'. A ray which is incident to the left of the roof edge 18 (FIG. 1a) is directed along the path 19 and reflected through the right mirror face 20. A ray which is incident to the right of the roof edge accordingly is reflected by the left mirror face 21. As long as the incident ray hits the mirror exactly in the plane of the roof edge 18, it is also reflected in this plane. The photodiodes are then not acted upon by the beam of rays. If, however, the incident ray or the pointer of the instrument deviates towards one direction or the other, a displacement of the beam of light takes place by means of the triple mirror in a manner described above, one of the photodiodes receives the beam of light and produces a follow-up impulse.

What I claim is:

1. A phototelectric device comprising a rotatable member, reflecting means mounted on said rotatable member in a position inclined to the axis of rotation of said rotatable member, a light beam source forming an incident light beam, means for directing said beam parallel to said axis of rotation onto said reflecting means whereby said reflecting means reflects said incident beam to describe a conical surface during rotation of said rotatable member, reflex-reflective means positioned to reverse said incident light beam substantially into itself at the base of said conical surface, photoelectric detecting means positioned to detect and register said reversed light beam and means positioned for directing said reversed beam to said photoelectric detecting means.

2. A photoelectric device comprising a rotatable member, reflecting means mounted on said rotatable member in a position inclined to the axis of rotation of said rotatable member, a light beam source forming an incident light beam, means for directing said beam parallel to said axis of rotation onto said reflecting means whereby said reflecting means reflects said incident beam to describe a conical surface during rotation of said rotatable member, reflex-reflective means positioned to reverse said incident light beam substantially into itself, at the base of said conical surface, lateral reflecting means positioned for reflecting said reversed beam out of said beam path before said beam reaches said light source, and photoelectric detecting means positioned to detect and register said reversed light beam.

3. A photoelectric device according to claim 2 wherein said reflex-reflecting means is arranged to reflect said reversed beam at a distance spaced-apart laterally with respect to said incident beam, said lateral reflecting means comprising a centrally apertured mirror inclined with respect to the axis of said incident beam and so positioned that said incident beam passes through the aperture of said mirror, and said displaced reversed beam is reflected laterally by said mirror.

4. A photoelectric device according to claim 2 wherein said reflex-reflecting means comprises an annular prism so arranged that said incident light beam enters said prism at a point spaced laterally from the top edge of said prism.

5. A photoelectric device according to claim 2 wherein said reflex-reflecting means is completely masked except for at least one narrow slot.

6. A photoelectric device according to claim 2 and characterized by further having a counting apparatus connected therewith, the rotatable member of said photoelectric device comprising the shaft of said counting apparatus.

7. A photoelectric device according to claim 2 mounted in conjunction with a measuring system having an indicator, said reflex-reflecting element comprising a triple mirror mounted on the indicator of said measuring system.

8. A photoelectric device according to claim 1 wherein said inclined reflecting means is arranged to be rotated and to cause said light beam to sweep periodically to define a conical surface, and wherein said photoelectric device is arranged to detect interruptions of said light beam caused by the entrance of an internal object into the space within said conical surface area to be protected.

9. A photoelectric device according to claim 1 wherein said reflecting means is comprised of a plurality of inclined mirrors in the form of a pyramid.

10. A photoelectric device according to claim 2 having an indicator arranged for indicating the position of a rotatable member, wherein said reflex-reflective means is mounted on said indicator, said photoelectric detector being arranged to produce an electrical impulse when illuminated by said light beam, and means actuated by the electrical impulse from said photoelectric detector for rotating said indicator, whereby said indicator is caused to track and indicate the position of said rotatable member.

References Cited in the file of this patent

UNITED STATES PATENTS

| | | |
|---|---|---|
| 2,406,299 | Koulicovitch | Aug. 20, 1946 |
| 2,447,344 | Kliever | Aug. 17, 1948 |
| 2,557,096 | Golay | June 19, 1951 |
| 2,798,961 | Wormser | July 9, 1957 |
| 2,855,521 | Blackstone | Oct. 7, 1958 |
| 2,958,783 | Taylor | Nov. 1, 1960 |
| 2,971,695 | Sick | Feb. 14, 1961 |
| 2,994,780 | Wilcox | Aug. 1, 1961 |

UNITED STATES PATENT OFFICE
CERTIFICATE OF CORRECTION

Patent No. 3,072,798　　　　　　　　　　　January 8, 1963

Erwin K. Sick

It is hereby certified that error appears in the above numbered patent requiring correction and that the said Letters Patent should read as corrected below.

Column 5, line 4, for "internal" read -- external --; lines 5 and 6, strike out "area to be protected".

Signed and sealed this 6th day of August 1963.

(SEAL)
Attest:

ERNEST W. SWIDER
Attesting Officer

DAVID L. LADD
Commissioner of Patents